Sept. 23, 1958

G. E. OLSON 2,852,966

CUTTING TOOL HOLDER

Filed Feb. 6, 1957

INVENTOR.
GUNNAR E. OLSON

BY

ATTORNEY

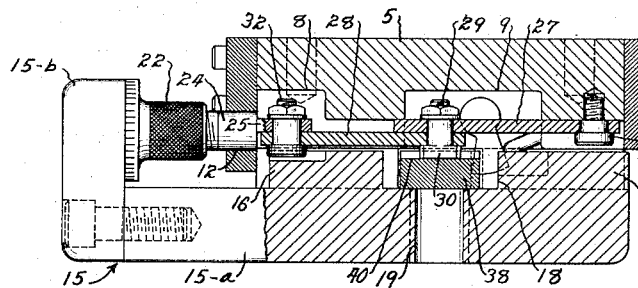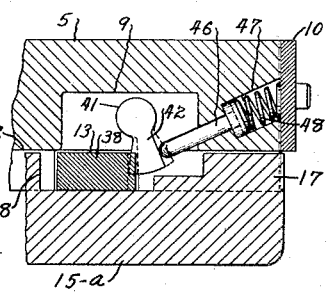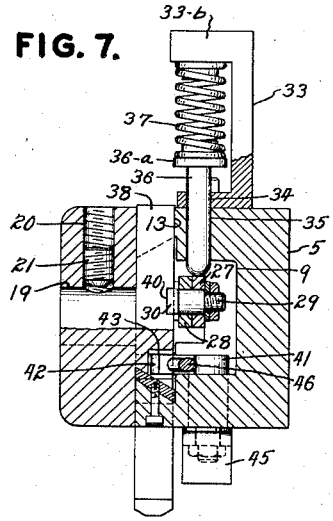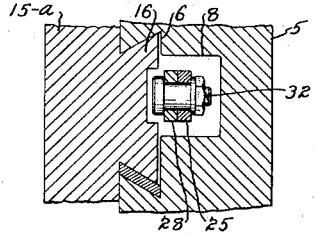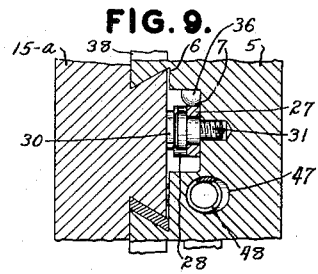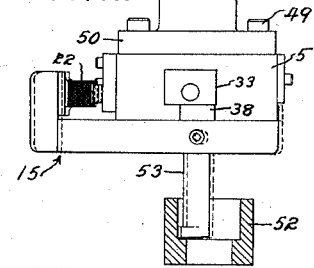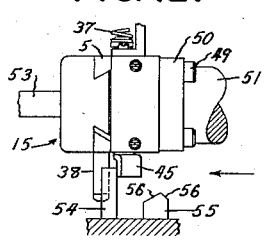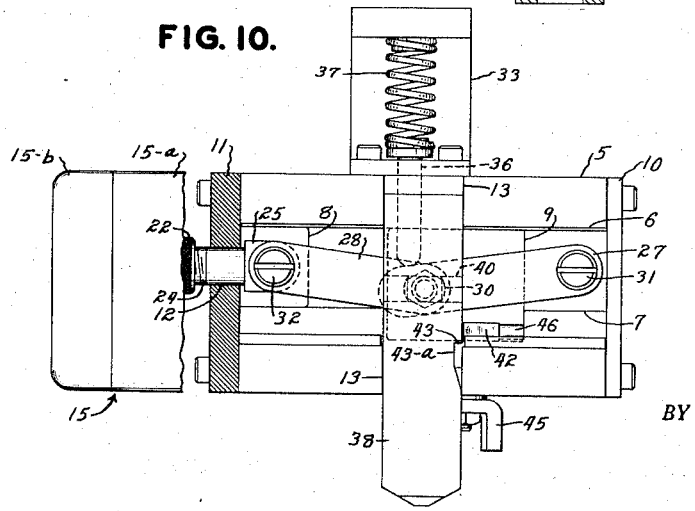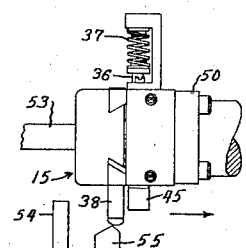

United States Patent Office 2,852,966
Patented Sept. 23, 1958

2,852,966

CUTTING TOOL HOLDER

Gunnar E. Olson, Columbia, Conn., assignor to The Hartford Tool & Die Company, Bloomfield, Conn.

Application February 6, 1957, Serial No. 638,531

1 Claim. (Cl. 77—58)

This invention relates to a cutting tool holder and more specifically to a tool holder for lathes and like machines and particularly those machines which are automatic.

During a cutting operation, the cutting tool is under considerable stress and therefore yields a small amount. Upon completion of the cutting operation, the stress upon the tool is relieved and its inherent springiness or resilience causes it to move toward the machined surface of the workpiece. If the tool is then returned to its starting position, it will leave a scratch or a spiral tool mark on the workpiece which in most cases cannot be tolerated.

The primary object of the present invention, therefore, is to provide a tool holder which will retract the cutting tool held thereby from the machined surface of a workpiece upon completion of a cutting stroke and thus prevent marring or otherwise damaging the machined surface with the cutting tool during the return stroke of the tool holder.

A further object of the present invention is to provide a cutting tool holder which will move the cutting tool between cutting and retracted positions automatically, and is thereby particularly adapted for use on automatic machines such as turret lathes and the like.

Another object of the present invention is to provide a tool holder of the stated type having means permitting minute adjustment of the cutting tool, thereby greatly facilitating the "setting up" of the machine.

Further objects and advantages of the invention will be more fully understood from the following description and the accompanying drawings in which:

Fig. 5 is a plan view of the tool holder partially in horizontal section on line 5—5 of Fig. 4.

Fig. 6 is a fragmentary, sectional, plan view thereof taken substantially on line 6—6 of Fig. 4.

Fig. 7 is a side elevational view of the tool holder taken in vertical section on line 7—7 of Fig. 4.

Fig. 8 is a fragmentary, sectional, side view taken on line 8—8 of Fig. 4.

Fig. 9 is a similar view taken on line 9—9 of Fig. 4.

Fig. 10 is a view similar to Fig. 4, but illustrating the position of the toggle mechanism when the tool carrier is retracted.

Fig. 11 is a plan view of the tool holder, on a reduced scale, illustrating the manner in which the tool holder operates upon the completion of a cutting stroke.

Fig. 12 is a side view of the tool holder, further illustrating its operation.

Fig. 13 is a similar view illustrating the manner in which the tool holder is returned to normal condition during its return stroke.

Figure 1:
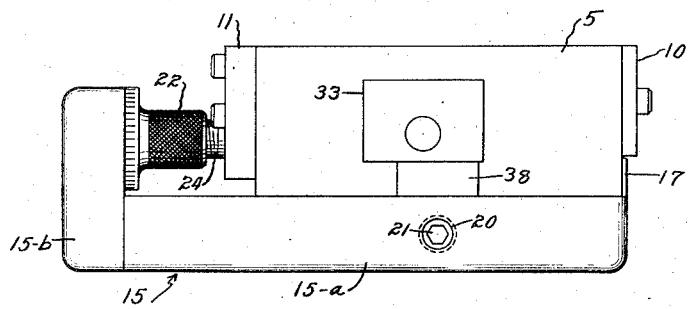
Fig. 1 is a plan view of the tool holder embodying the present invention.
Figure 2:
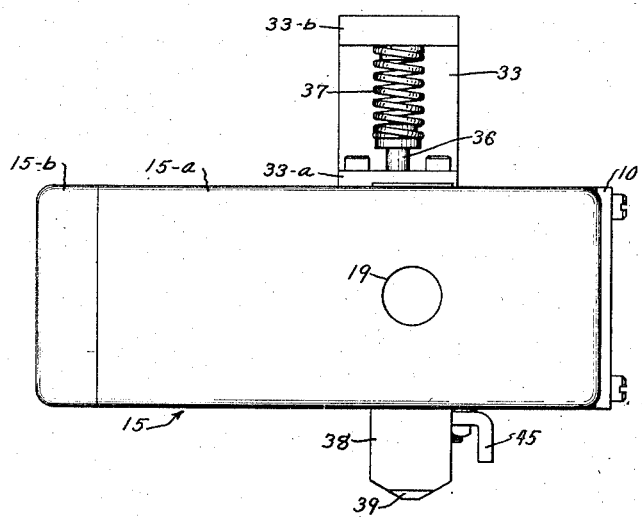
Fig. 2 is a front elevational view thereof.
Figure 3:
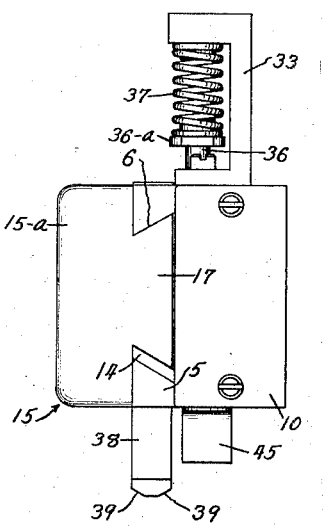
Fig. 3 is a side elevation of said tool holder.
Figure 4:
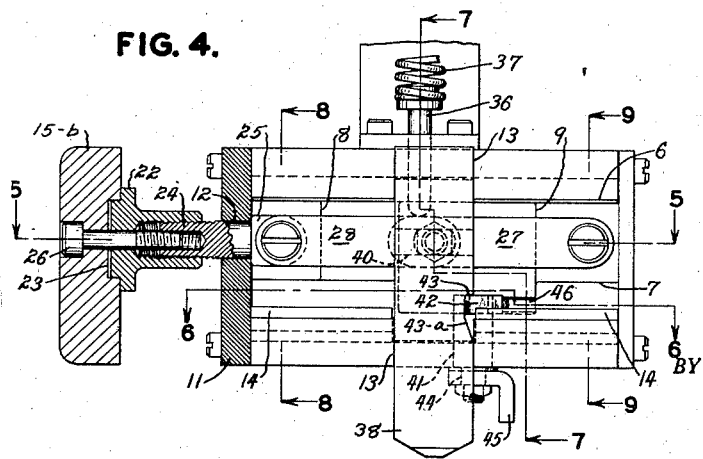
Fig. 4 is a front elevational view of said tool holder, with portions of the tool carrying member omitted, illustrating the toggle mechanism by which said carrying member is operated and showing said mechanism in its normal position.

The cutting tool holder illustrated in the accompanying drawing comprises a base 5 of rectangular block-like configuration having a dovetail slot 6 extending longitudinally thereof and opening to its front face. A secondary slot 7 extends into the base from the bottom of the slot 6, and portions of the base at the bottom of the secondary slot are cut away to provide a pair of deep recesses 8 and 9 therein which are best shown in Figs. 4 through 8. The recess 8 opens to the adjacent end of the base, and the recess 9 extends below the lower side of the slot 7. The right-hand end of the slot 7 is closed by a cover plate 10 whose front edge lies flush with the bottom of the slot 6, and to the left-hand end of the base there is fastened a second cover plate 11 which extends over the open end of the recess 8 and has a hole 12 therethrough that is disposed on an axis extending centrally between the side walls of the slot 7. The portions of the base forming the side walls of the slot 6 are provided with aligned, transversely extending slots 13—13 which open to the front face of the base and terminate just short of the bottom of the said slot 6. Gibs 14—14 are fastened to the lower inclined side wall of the slot 6 at the opposite sides of the slot 13 as best shown in Fig. 4.

The tool holder also includes a carrier member 15 which is L-shaped in form and comprises a front plate 15–a having an end plate 15–b fastened to its left-hand end and extending rearwardly therefrom. The rear face of the front plate 15–a contains aligned dovetail projections 16 and 17 which are slidably received in the dovetail slot 6 in the base and are spaced apart to provide a slot 18 therebetween which extends transversely across the front plate 15–a for the full depth of the projections 16 and 17 and in alignment with the slots 13—13 in the base as shown in Fig. 5. The front plate of the carrier member contains a perpendicular hole 19 which is adapted to receive a cutting tool, such as a boring bar, and is also provided with a threaded transverse hole 20 which communicates with the hole 19 and receives a set screw 21 by which a cutting tool received in the hole 19 is securely fastened to the carrier member.

The carrier member is attached to its operating mechanism through adjustable connecting means comprising an internally threaded sleeve 22 that is mounted to rotate in a recess 23 in the end plate 15–b and is threaded to a shaft 24 which extends through and is slidable in the hole 12 in the cover plate 11. The shaft has a flat, vertically disposed head portion 25 that lies within the slot 7 adjacent the recess 8 and said shaft is connected to the end plate 15–b by a locking screw 26 that extends through said end plate, through an axial hole in the sleeve 22 and is threaded into a threaded axial hole in the shaft as shown in Fig. 4. When the screw 26 is tightened, the sleeve 22 is clamped tightly between the shaft 12 and the end plate and cannot be rotated.

The carrier member is operated through a toggle linkage that lies within the slot 7 and comprises a pair of oppositely extending flat links 27 and 28 having overlapping adjacent end portions which are pivotally connected by a pivot pin 29 having a head 30 which is disposed toward the front of the base and is flattened on its opposite sides. It will be noted from Figs. 5 and 7 that the head 30 projects forwardly of the bottoms of the slots 13—13. The opposite end of the link 27 is pivotally connected to the base by a pivot screw 31 that is threaded into a hole extending into the base from the bottom of the slot 7. The opposite end of the link 28 is pivotally connected to the head 25 on the shaft 12 by a pivot pin 32, and it will be seen in Figs. 5 and 8 that the projection 16 on the carrier member is recessed to accommodate the head of this pin. The carrier member 15 is held in its normal position when the links 27 and 28 are disposed in alignment, or fully extended position, as illustrated in Fig. 4.

On the top of the base 5 there is mounted a bracket 33 having a lower leg 33–a, that is fastened to the top of the base, and an upper leg 33–b. The lower leg 33–a and the base are provided with aligned vertically extending holes 34 and 35 that are disposed on an axis intersecting the free end of the toggle link 27. A plunger 36 is slidably mounted in said holes and the lower end of said plunger is urged against the link 27 by a compression spring 37 which is contained between a head 36–a on the upper end of the plunger and the upper leg 33–b of the bracket.

The toggle linkage is connected to a cocking bar 38 which is slidably mounted in the slots 13—13 in the base and is retained therein by the carrier member. Said cocking bar projects below the base and is provided on its lower end with opposed transversely extending cam surfaces 39—39. The inner side of the cocking bar contains a transversely extending recess 40 which slidably receives the head 30 of the pivot pin 29, thereby connecting said cocking bar to the "knee" of the toggle linkage.

In order to retain the toggle linkage and the cocking bar in normal position, shown in Fig. 4, against the force of the spring 37, I have provided a latch member 41 which is rotatably mounted in a vertical hole in the base 5 that extends between the bottom of the base and the lower side of the recess 9 therein. Said latch is provided with a radially extending latching finger 42 that is supported upon the lower side of said recess 9 and is movable into and out of engagement with a downwardly facing shoulder 43, formed by a notch 43–a in the adjacent edge of the cocking bar, when the bar is in its uppermost position, as shown in Fig. 4. The lower end of the latch member 41 is provided with a square shank 44 to which a top lever 45 is detachably and non-rotatably fastened.

The latch member is biased toward latching position by a spring loaded plunger 46 that is slidably contained in a counterbored hole 47 that extends obliquely into the right-hand end of the base and communicates with the recess 9. The plunger is urged against the side of the radial latching finger 42 by a compression spring 48 that is disposed between the head of the plunger and and the cover plate 10.

The cutting tool holder can be "set up" on a lathe or like machine in many different ways and is capable of performing a number of different cutting operations with various types of cutting tools as will be obvious to those skilled in the art. It will also be understood that the carrier member can be modified to accept cutting tools other than that shown. In Figs. 11 through 13 of the drawings, however, I have shown one application of the tool holder which clearly illustrates the manner in which it is used and operates.

In the particular example shown, the base of the tool holder is fastened, by screws 49, to a supporting member 50 having a shank 51 that is adapted to be held in the tool post or turret of a lathe. The tool holder is disposed in a horizontal position and is carried in opposite directions axially with respect to a workpiece 52 held in the lathe chuck. A boring bar 53 is secured to the hole 19 in the carrier member and is adapted to perform a cutting operation on the interior of the workpiece 52.

In setting up the lathe for use with my tool holder in the manner shown, an abutment member 54 is fastened to the bed of the lathe forwardly of the tool holder and in the path of the trip lever 45. This abutment is so located that it will operate the latch member 41 to release the cocking bar precisely at the end of the desired cutting stroke on the workpiece 52. A separate abutment member 55 is fastened to the bed of the machine in alignment with the cocking bar and in a position wherein it will be engaged by the lower end of said cocking bar during the return stroke of the tool holder, but after the boring bar has been completely withdrawn from the workpiece. The abutment member 55 has oppositely facing cam surfaces 56—56 which are engageable with the cam surfaces 39—39 on the end of the cocking bar and said abutment is provided to cam said bar upwardly into normal position as it passes thereover on said return stroke.

The carrier member may be adjusted relatively to the base, to locate the boring bar for the proper depth of cut, by means of the adjusting sleeve 22 whose position on the shaft 12 determines the normal position of the carrier member.

The normal position of the carrier member is shown in full lines in Fig. 11 and it will be understood that as the tool holder is advanced toward the workpiece, the boring bar will perform the desired cutting operation. At a predetermined point in the cutting stroke, the trip lever 45 will be carried into engagement with the stationary abutment 54 on the bed of the machine, and as the tool holder moves through the remainder of the cutting stroke, the latch member 41 will be rotated into unlatched position as shown in dotted lines in Fig. 6. The abutment 54 is arranged to cause disengagement of the latch finger 42 from the cocking bar at exactly the end of the desired cutting stroke, whereupon the spring loaded plunger 36 will urge the toggle links 27 and 28 and the cocking bar downwardly with respect to the base into the position shown in Fig. 10, further movement of the mechanism being prevented by engagement of the link 28 with the edge of the slot 7 adjacent the recess 9. Pivotal movement of the link 27 to the position shown causes displacement of the pivot pin 29 and the link 28 to the right, as viewed in Fig. 10, and the carrier member is thus moved laterally with respect to the base into the position shown in dotted lines in Fig. 11 wherein the boring bar 53 will be retracted from the machined surface of the workpiece. It will be understood that as the link 27 pivots between its respective positions, the head 30 on the pivot pin 29 slides in the slot 40 transversely of the cocking bar.

When the mechanism is in the position shown in Fig. 10, the lower end of the cocking bar is disposed in interfering position with respect to the abutment 55 so that as the tool holder is carried back through its return stroke, the lower end of the cocking bar will engage the front cam surface 56 and said bar will be cammed upwardly relatively to the base as it is carried past said abutment to thereby return the toggle links to aligned position and thus shift the carrier member and the boring bar back to normal position. When the cocking bar reaches normal position, the plunger 46 will urge the latch finger 42 into latching engagement with the cocking bar and said latch finger will thereby retain the cocking bar in normal position as it moves out of engagement with the abutment 55.

I claim:

In combination, a cutting tool holder adapted to hold a cutting tool in cutting position as it is advanced across the surface of a workpiece and to retract said tool from said surface for its return stroke, said holder comprising a base adapted to be attached to the movable tool holder of a machine, a carrier member mounted to slide on said base and adapted to carry a cutting tool, operating mechanism connected to said base and said carrier member adapted to shift said carrier member between a first position wherein the cutting tool is in cutting position and a second position wherein the cutting tool is retracted, cocking means connected to said mechanism and movable therewith between normal and projected positions, latching means spring pressed into engagement with said cocking means when in said normal position and thereby preventing operation of said mechanism to hold said carrier member in said first position, stationary abutment means on said machine adapted to cause movement of the latching means out of engagement with said cocking means at a predetermined point in a cutting stroke, spring means acting upon said mechanism and adapted to cause operation thereof when the cocking means is released to thereby shift said carrier member to said second position and said cocking means to projected position, a stationary cam member on said machine adapted to be engaged by said cocking means at a predetermined point in said return stroke and to urge said cocking means into its normal position whereby said mechanism is operated to shift said carrier member back to said first position.

References Cited in the file of this patent

UNITED STATES PATENTS

| | | |
|---|---|---|
| 2,273,228 | Smith | Feb. 17, 1942 |
| 2,310,556 | Strong | Feb. 9, 1943 |
| 2,438,558 | Hollander | Mar. 10, 1948 |

FOREIGN PATENTS

| | | |
|---|---|---|
| 757,121 | Great Britain | Mar. 5, 1954 |